United States Patent
Tachi et al.

[11] Patent Number: 5,962,142
[45] Date of Patent: Oct. 5, 1999

[54] TWO-COLORED MOLDED PRODUCT OF POLYURETHANES MADE BY RIM AND PROCESS FOR MANUFACTURING THE SAME

[75] Inventors: Katsumi Tachi, Ichinomiya; Toshihiko Asaya, Nagoya; Satoru Ono, Yoro-gun; Hisashi Mizuno, Ichinomiya, all of Japan

[73] Assignee: Toyoda Gosei Co., Ltd., Aichi-ken, Japan

[21] Appl. No.: 08/827,008

[22] Filed: Mar. 25, 1997

[30] Foreign Application Priority Data

Mar. 28, 1996 [JP] Japan .................................. 8-103911

[51] Int. Cl.$^6$ ................................... B32B 27/00
[52] U.S. Cl. .................. 428/423.1; 428/195; 428/318.8; 428/320.2; 428/321.1; 428/322.2; 428/423.9; 428/424.2; 528/53; 528/55; 528/57; 521/51; 521/55; 521/124; 521/125; 264/46.4; 264/46.6; 264/54; 264/255; 264/267
[58] Field of Search .............................. 428/318.8, 423.9, 428/322.2, 320.2, 424.2, 321.1, 423.1; 264/46.6, 54, 255, 328.6, 267, 46.4; 524/779; 521/51, 124, 125, 55, 160, 139; 528/53, 55, 57, 60, 61

[56] References Cited

U.S. PATENT DOCUMENTS

| | | | |
|---|---|---|---|
| 4,025,466 | 5/1977 | Jourquin et al. | 521/115 |
| 4,150,206 | 4/1979 | Jourquin et al. | 521/51 |
| 4,389,454 | 6/1983 | Horacek et al. | 428/318.6 |
| 5,071,613 | 12/1991 | Fukami et al. | 264/257 |
| 5,159,012 | 10/1992 | Doesburg et al. | 524/779 |

FOREIGN PATENT DOCUMENTS 6-143340  5/1994  Japan.

*Primary Examiner*—Deborah Jones
*Assistant Examiner*—Abraham Bahta
*Attorney, Agent, or Firm*—Pillsbury Madison & Sutro LLP

[57] ABSTRACT

A small amount of a non-yellowing surface-forming polyurethane material containing a polyether polyol, a hexamethylene diisocyanate trimer, a coloring agent and an organic bismuth catalyst is initially injected into a mold cavity under reduced pressure to form e.g. the surface portion of a polyurethane covering for a steering wheel. An inner-forming polyurethane material is subsequently injected into the cavity under reduced pressure to form an inner portion of the covering.

10 Claims, 8 Drawing Sheets

TWO-COLORED MOLDED PRODUCT OF POLYURETHANES MADE BY RIM AND PROCESS FOR MANUFACTURING THE SAME

The priority application, Japanese Patent Application No. 8-103911, filed in Japan on Mar. 28, 1996, is hereby incorporated into the present specification by reference.

BACKGROUND OF THE INVENTION

1. Field of the Invention

This invention relates to a two-colored molded product of polyurethanes made by a reactive injection molding (RIM), which has a surface portion and an inner portion differing from each other in color and properties, and a process for manufacturing the same.

2. Description of the Related Art

A conventional RIM process for manufacturing a molded product of polyurethanes usually includes such steps as will be stated below with reference to FIGS. 8 to 10:

(1) A mold 100 is opened, and the wall 101 of its cavity is coated with a mold release agent 102 which is applied by e.g. spraying, as shown in FIG. 8.

(2) An in-mold coating material 103 is applied by e.g. spraying along the cavity wall 101 so as to lie on the mold release agent 102. The in-mold coating material 103 is a mixture of a polyurethane material of high light resistance and a coloring agent.

(3) An insert 104, if any, is set in the cavity, and the mold 100 is closed.

(4) A RIM polyurethane material 105 is injected into the cavity and allowed to undergo reaction and curing, as shown in FIG. 9.

(5) The mold 100 is opened, and a molded product of polyurethanes is removed from the mold. The molded product 106 has a surface portion formed from the in-mold coating material 103 and an inner portion formed from the RIM polyurethane material 105, as shown in FIG. 10.

The steps of applying the mold release agent 102 and the in-mold coating material 103 have hitherto occupied so long a time in a molding cycle as to hinder any appreciable shortening of the molding cycle. The spraying of the in-mold coating material 103 has presented a problem, since it adheres also to Parting Line surfaces 107 contiguous to the cavity wall 101 and forms a burr 108 on the molded product 106, as shown in FIG. 10. A deburring job is, therefore, necessary.

The applicant, therefore, developed an invention covering a process for manufacturing a two-colored molded product of polyurethanes by RIM techniques which comprises injecting a small amount of a mixture of a polyurethane material, a mold release agent, a coloring agent and a catalyst into a mold cavity having a reduced pressure so that it may adhere to the whole surface of the wall of the cavity and form the surface portion of a molded product. Then another polyurethane material is injected into the cavity to form its inner portion (Japanese Patent Application Laid-open Specification No. 6-143340). This process has made it possible to eliminate the steps of applying the mold release agent and the in-mold coating material to the cavity wall before starting the molding step, and substantially overcomes the problem of deburring as stated above.

There has, however, been a problem facing the new process, since no polyurethane material that can be considered optimum has been found for use in forming the surface portion of a molded product. Light resistance and wear resistance are required of a surface-forming polyurethane material. It is preferable from the standpoint of light resistance to use a non-yellowing material made by employing an aliphatic isocyanate. The non-yellowing material, however, is usually so slow in its urethane reaction as hardly to cure in several minutes after adhering to the wall of the mold cavity. Therefore, it not only requires a greatly prolonged molding cycle, but is also likely to be driven away by the polyurethane material which is injected for forming the inner portion of a molded product, and its surface portion is likely to have an unduly reduced thickness particularly in the vicinity of the gate. Moreover, the non-yellowing material is usually low in wear resistance, too.

SUMMARY OF THE INVENTION

It is, therefore, an object of this invention to provide a two-colored molded product of polyurethanes made by RIM techniques and a process for manufacturing the same which make it possible to eliminate the steps of applying an in-mold coating material to the wall of a mold cavity prior to injection molding to thereby overcome any problem of deburring, and to use a non-yellowing material of high light resistance as a surface-forming polyurethane material and yet accelerate its curing to thereby realize a shortened molding cycle, while it is also possible to obtain an outstandingly improved wear resistance.

A two-colored molded product of polyurethanes made by RIM of the present invention comprises a surface portion formed by injecting a small amount of a non-yellowing surface-forming polyurethane material containing a polyether polyol, a hexamethylene diisocyanate trimer, a coloring agent and an organic bismuth catalyst into a mold cavity under reduced pressure, and an inner portion formed by injecting an inner-forming polyurethane material into said cavity under reduced pressure.

A process for manufacturing a two-colored molded product of polyurethanes by RIM of the present invention comprises the steps of creating a reduced pressure in a mold cavity, injecting a small amount of a non-yellowing surface-forming polyurethane material containing a polyether polyol, a hexamethylene diisocyanate trimer, a coloring agent and an organic bismuth catalyst into said cavity under reduced pressure, and injecting an inner-forming polyurethane material into said cavity under reduced pressure.

The above-mentioned organic bismuth catalyst is not limited to a specific one, and it may be at least one selected from the group consisting of bismuth neodecanoate, bismuth isodecanoate and bismuth octylate.

Another two-colored molded product of polyurethanes made by RIM of the present invention comprises a surface portion formed by injecting a small amount of a non-yellowing surface-forming polyurethane material containing a polyether polyol, a hexamethylene diisocyanate trimer, a coloring agent and a mixed catalyst into a mold cavity under reduced pressure, said mixed catalyst being a mixture of a first catalyst having the chemical formula

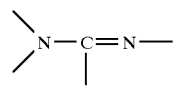

and a second catalyst represented by the chemical formula

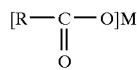

where M stands for an alkali metal or an alkaline earth metal, and R stands for hydrogen, an alkyl group having 1 to 20 carbon atoms, an alkenyl or alkynyl group having 2 to 20 carbon atoms (any of these groups being of the straight or branched chain type, and optionally replaced by one carboxyl group, or one or more halogens), a cycloalkyl group having 3 to 6 carbon atoms [this group being unsubstituted, or replaced by one carboxyl group, or one or more alkyl groups having 1 to 6 carbon atoms, or alkenyl or alkynyl groups having 2 to 6 carbon atoms (any of these groups being of the straight or branched chain type)], or an aryl group [this group being unsubstituted, or replaced by one or more halogens, or one or more alkyl groups having 1 to 8 carbon atoms, or alkenyl or alkynyl groups having 2 to 8 carbon atoms (any of these groups being of the straight or branched chain type), or one aryl group or one carboxyl group](U.S. Pat. No. 4,025,466), and an inner portion formed by injecting an inner-forming polyurethane material into said cavity under reduced pressure.

Another process for manufacturing a two-colored molded product of polyurethanes by RIM of the present invention comprises the steps of creating a reduced pressure in a mold cavity, injecting a small amount of a non-yellowing surface-forming polyurethane material containing a polyether polyol, a hexamethylene diisocyanate trimer, a coloring agent and the above-mentioned mixed catalyst into said cavity under reduced pressure, and injecting an inner-forming polyurethane material into said cavity under reduced pressure.

The first catalyst of the above-mentioned mixed catalyst is not limited to a specific one, and it may be at least one selected from the group consisting of DBU (1,8-diaza-bicyclo-(5, 4, 0) undecene-7), DBN (1,5-diaza-bicyclo-(4, 3, 0)nonene-5) and a phenolic salt of DBU (for example, "U-CAT SA-1", tradename of SAN-APRO CO., LTD.). The second catalyst, which is an alkali metal salt or an alkaline earth metal salt of carboxylic acid, is not limited to a specific one, either, and it may be at least one compound selected from the group consisting of potassium octylate, sodium octylate and sodium formate.

The first and second catalysts preferably have a mixing ratio of about 1:1 to 1:5. The gelation time tends to vary as the amount of the first catalyst varies, while the curing time tends to vary as the amount of the second catalyst varies. This is considered to be because of the following reason. The addition of the first catalyst changes the solution to be basic, which activates NCO, thereby quickening the initial reaction. And then, due to the heat produced by the initial reaction, the second catalyst operates to quicken the curing.

A mold release agent may be added to the surface-forming polyurethane material of each of the above-described products or processes.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
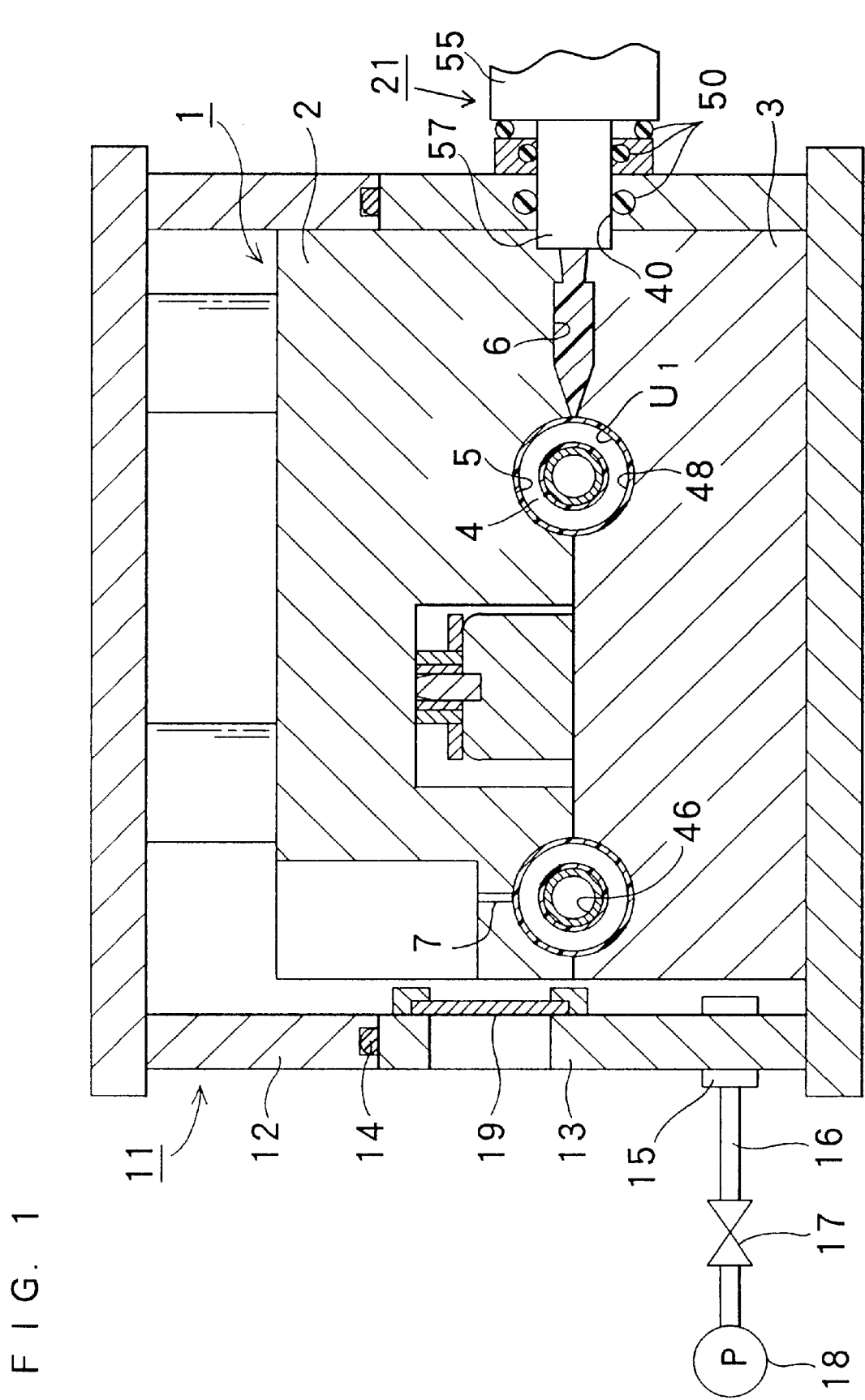
FIG. 1 is a sectional view showing the step of forming a surface portion of a polyurethane covering for a steering wheel in a process according to an embodiment of this invention.

Description will now be made of the reactive injection molding of two-colored polyurethane coverings for steering wheels by processes embodying this invention with reference to FIGS. 1 to 7.

An embodiment of this invention employs a molding apparatus including a mold 1, a vacuum casing 11 and a material injection mechanism 21, as shown in FIGS. 1 to 5, and as will hereinafter be described in detail.

The mold 1 comprises an upper portion 2 and a lower portion 3 which are separate from each other. The upper and lower mold portions 2 and 3 define therebetween an annular cavity 4 formed by their cavity walls 5 and a gate 6 leading to the cavity 4 when they are joined together along a parting line. The upper mold portion 2 has a vent hole 7 formed in its final filling portion which is the last portion to be filled with a polyurethane material.

The vacuum casing 11 comprises an upper portion 12 and a lower portion 13 which are separate from each other. The upper mold portion 2 is mounted in the upper casing portion 12, and the lower mold portion 3 is supported in the lower casing portion 13. The upper and lower casing portions 12 and 13 are connected to a clamping device not shown, and the lower casing portion 13 is vertically movable to be joined with, or separated from the upper casing portion 12 to thereby join the upper and lower mold portions 2 and 3, or separate them from each other. The upper casing portion 12 has an O-ring 14 held in a groove formed in its parting surface, so that the O-ring 14 may engage the parting surface of the lower casing portion 13 to form a seal between the upper and lower casing portions 12 and 13 when the casing 11 is closed.

The lower casing portion 13 is provided with a suction plug 15 to which a vacuum pump 18 is connected through a suction hose 16 and a valve 17. The lower casing portion 13 has a gastight window 19 through which the vent hole 7 and its vicinity are visible from outside the vacuum casing 11.

Figure 5:
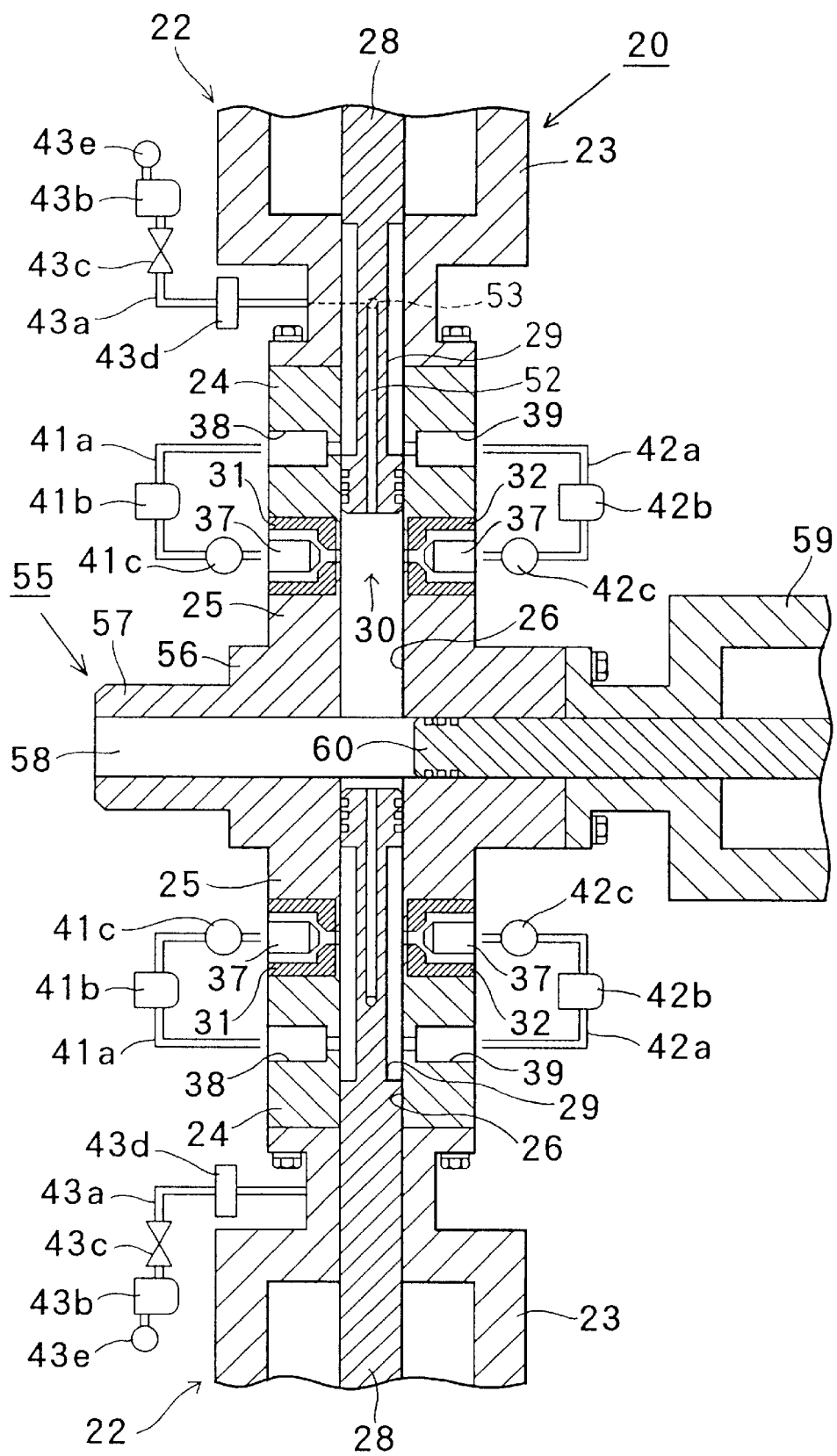
FIG. 5 is a sectional view of a mixing head employed in the same process.

The material injection mechanism 21 includes a six-component mixing head 20 which comprises two three-component mixing heads 22 connected to a central injection mechanism 55, as shown in FIG. 5.

The upper three-component mixing head 22 in FIG. 5 is used for preparing a surface-forming polyurethane material U1 (a non-yellowing material of high light resistance), and can mix a polyether polyol (a main component) containing a chain extender and an organic bismuth catalyst or the above-mentioned mixed catalyst, a hexamethylene diisocyanate trimer (another main component) and a coloring agent as a third component. It is possible to add an appropriate amount of a mold release agent to the polyol, or the third component. It is alternatively possible to add the coloring agent to the polyol without employing it as the third component.

The lower three-component mixing head 22 in FIG. 5 is used for preparing an inner-forming polyurethane material U2 (an ordinary yellowing material), and can mix a polyol (a main component) containing a chain extender, a catalyst and the like, 4,4'-diphenylmethane diisocyanate (another main component) and a coloring agent as a third component. It is possible to add the coloring agent to the polyol without employing it as the third component, or not to use any coloring agent at all.

Each of the upper and lower three-component mixing heads 22 comprises a cylinder 23 and a body 24 attached to one end thereof that terminates in an injection nozzle 25. The body 24 has a through bore 26 in which a spool 28, attached to a piston (not shown) in the cylinder 23, is slidably fitted. The spool 28 has a pair of longitudinally extending elongated grooves 29 formed in its outer surface in a diametrically opposite relationship to each other. The reciprocating motion of the piston causes the spool 28 to slide between its advanced position and its retracted position, and a mixing chamber 30 for mixing the components, which will be described later in detail, is defined ahead of the spool 28 in its retracted position.

The body 24 has a cylindrical nozzle body 31 for the polyol component and a cylindrical nozzle body 32 for the isocyanate component fitted in a pair of diametrically opposite wall portions, respectively. Each nozzle body 31 or 32 has a tapered orifice opening in the mixing chamber 30 or one of the grooves 29. A holder (not shown) is attached to the outer surface of the body 24 for holding each nozzle body 31 or 32, and a needle 37 extending therethrough has an end adapted to adjust the opening of the orifice. The body 24 also has a reflux or recycle hole 38 for the polyol component and a reflux or recycle hole 39 for the isocyanate component formed adjacent to the nozzle bodies 31 and 32, respectively, and connected with the grooves 29, respectively.

A tank 41b and a pump 41c for the polyol component are connected between the nozzle body 31 and the reflux hole 38 by a hose 41a to define a path for the circulation of the polyol component which starts at the tank 41b, goes through the pump 41c, the nozzle body 31, the corresponding groove 29 and the reflux hole 38, and ends at the tank 41b. Likewise, a tank 42b and a pump 42c for the isocyanate component are connected between the nozzle body 32 and the reflux hole 39 by a hose 42a to define a path for the circulation of the isocyanate component which starts at the tank 42b, goes through the pump 42c, the nozzle body 32, the corresponding groove 29 and the reflux hole 39, and ends at the tank 42b.

The spool 28 has an auxiliary discharge bore 52 formed along its longitudinal axis for discharging a third component. The auxiliary discharge bore 52 has a front end opening in the front end of the spool 28, and a rear end opening in the outer periphery of the spool 28 intermediate the ends thereof. The body 24 has an introduction hole 53 formed in its rear portion so as to be connected with the rear end of the auxiliary discharge bore 52 only when the spool 28 is in its retracted position. A tank 43b, a valve 43c and a flow control device 43d for the third component are connected to the introduction hole 53 by a hose 43a, and an air pressurizing device 43e is connected to the tank 43b to maintain an elevated pressure therein. The valve 43c may be situated in any location between the tank 43b and the body 24. The valve 43c may be of, for example, the pneumatically or electrically driven type. The opening and closing of the valve 43c are controlled by, for example, a special timer, or an internal timer in a sequence.

The injection mechanism 55 has a body 56 connecting two (upper and lower) injection nozzles 25. The body 56 has a through bore 58 to which the two injection nozzles 25 are open, and in which a spool 60, attached to a piston (not shown) in a cylinder 59, is slidably fitted. The body 56 ends in an injection nozzle 57, which extends through a through hole 40 formed in a wall of the lower casing portion 13, and is connected to the gate 6 in the lower mold portion 3. A plurality of O-rings 50 form a seal between the injection mechanism 55 and the through hole 40.

The process embodying this invention using the above-described molding apparatus will now be described in the order of its steps for the manufacture, by a RIM process, of a two-colored polyurethane covering.

(1) The upper and lower mold portions 2 and 3 of the mold 1 are separated from each other, and a mold release agent is applied to the cavity walls 5. In case the below-described surface-forming polyurethane material U1 contains an appropriate amount of mold release agent, this step of applying the mold release agent can be omitted.

(2) A metal core 46 for a steering wheel 45 is set in the lower mold portion 3, and the upper and lower mold portions 2 and 3 are joined together to form the cavity 4, while the upper and lower casing portions 12 and 13 are joined together to close the vacuum casing 11 tightly.

(3) The vacuum pump 18 is driven to evacuate the vacuum casing 11 to an appropriate vacuum degree to create a reduced pressure in the cavity 4 by drawing out air through the vent hole 7.

(4) Step of injecting a surface-forming material:

The spool 28 in the upper three-component mixing head 22 shown in FIG. 5 is retracted, and the polyol component (polyether polyol containing a chain extender, an organic bismuth catalyst or the above-mentioned mixed catalyst, and the like) and isocyanate component (hexamethylene diisocyanate trimer) are discharged through the nozzle bodies 31 and 32, respectively, into the mixing chamber 30, while the valve 43c is opened to discharge a coloring agent as the third component through the auxiliary discharge bore 52 into the mixing chamber 30, so that they may impinge upon one another and be mixed together to form a surface-forming polyurethane material U1. The spool 28 in the lower mixing head 22 is kept in its advanced position to prevent any material from being charged into its mixing chamber.

The polyurethane material U1 is discharged through the injection nozzle 57 of the injection mechanism 55, and injected through the gate 6 into the cavity 4 maintained at a reduced pressure, as shown in FIG. 1. A sudden pressure drop to which the polyurethane material U1 having an elevated pressure is subjected upon injection causes the bumping of naturally adsorbed gases in the material U1 and thereby its scattering in the cavity 4 to form a film adhering to substantially the whole surfaces of the cavity walls 5 as the surface portion (outer surface layer) 48 of a polyurethane covering 47.

The injected surface-forming polyurethane material U1 is allowed to cure for a curing time. It does not need to be cured or harden completely, but may be allowed to be cured to an extent that it may not be carried away by the streams of the inner-forming polyurethane material U2 when the inner-forming material is subsequently injected. Though the surface-forming polyurethane material U1 of the present embodiment is a non-yellowing material using a hexamethylene diisocyanate trimer, which usually has a lower rate of urethane reaction, an urethane reaction proceeds promptly after its adherence to the cavity walls since it contains an organic bismuth catalyst or the above-mentioned mixed catalyst, which acts on the non-yellowing material specifically. Accordingly, curing time is hardly needed, and it can be shortened to about 0.05 seconds.

(5) Step of injecting an inner-forming material:

The spool 28 in the lower mixing head 22 shown in FIG. 5 is retracted, and its mixing chamber 30 is charged with polyol component (polyol containing a chain extender, a catalyst and the like) and isocyanate component (4,4'-diphenylmethane diisocyanate), and a third component, if any, so that they may collide and get mixed with each other to form an inner-forming polyurethane material U2. The spool 28 in the upper mixing head 22 is advanced to prevent any material from being charged into its mixing chamber.

Figure 2:
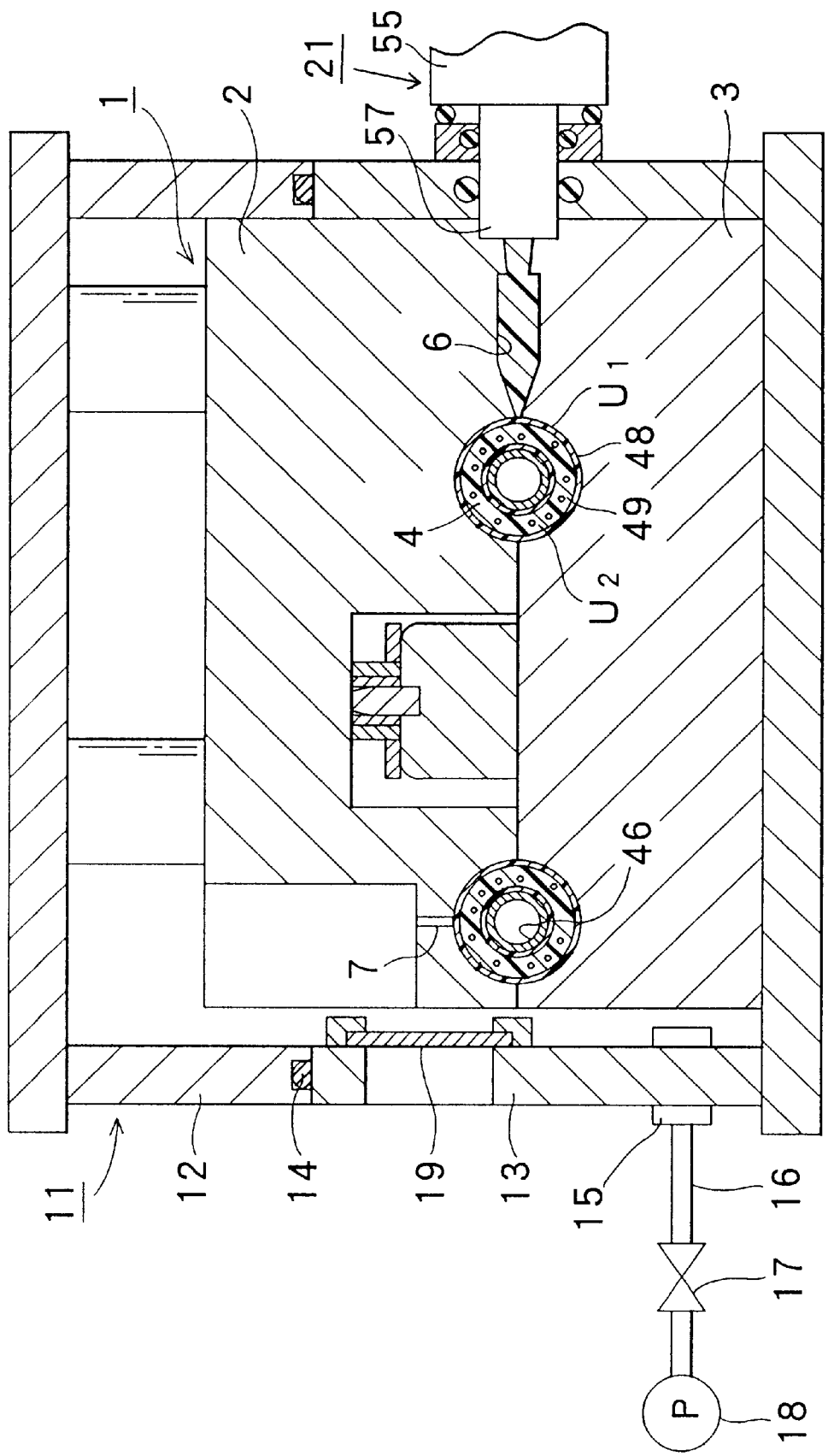
FIG. 2 is a sectional view showing the step of forming an inner portion of the same polyurethane covering in the same process.

The polyurethane material U2 is discharged through the injection nozzle 57, and injected through the gate 6, which is the same as was used in the step of injecting a surface-forming material, into the cavity 4 maintained at a reduced pressure, as shown in FIG. 2. The injected polyurethane material U2 in a region far from the cavity walls 5 forms a highly foamed core as a result of the bumping of naturally adsorbed gases in an environment having a reduced pressure. The material U2 near the cavity walls 5 forms a low foamed self-skin layer of high density by the degassing caused by the reduced pressure. The core and self-skin layer constitute the inner portion (inner layer) 49 of the polyurethane covering 47 (see FIG. 6). As a result, the cavity 4 is filled with all of the materials U1 and U2, and a small amount of the polyurethane material U2 at the leading ends of its streams flows out through the vent hole 7 and forms a solidified outflow 9.

The surface portion 48 does not have its thickness reduced to an extent that would allow the inner portion 49 to be seen through even the part formed in the vicinity of gate 6. This is the case because of the intervening step, the surface portion 48 is sufficiently solid so as not to be carried away by the streams of the inner-forming polyurethane material U2.

Figure 3:
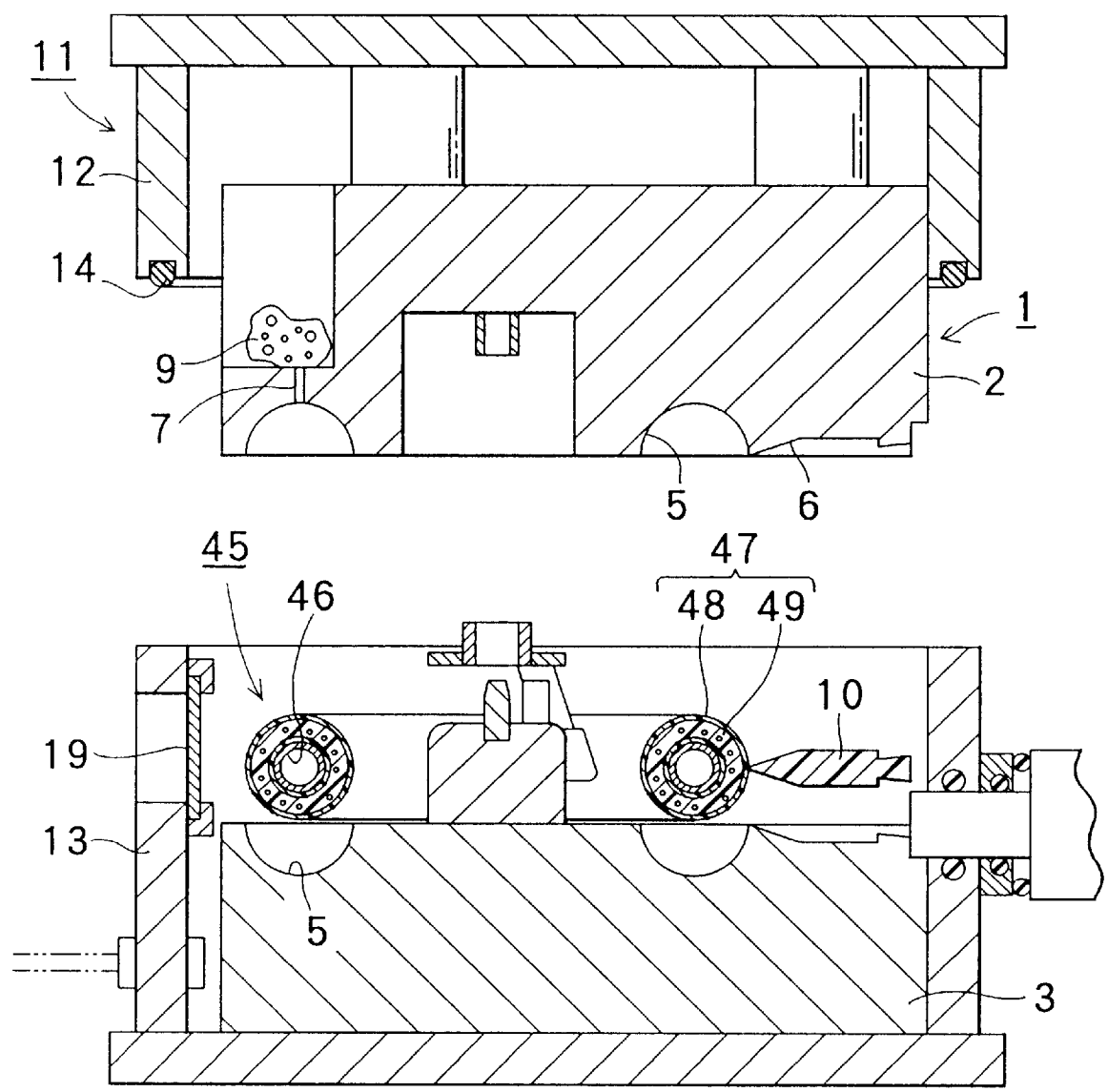
FIG. 3 is a sectional view showing the step of removing a molded product from the mold in the same process.
Figure 4A:
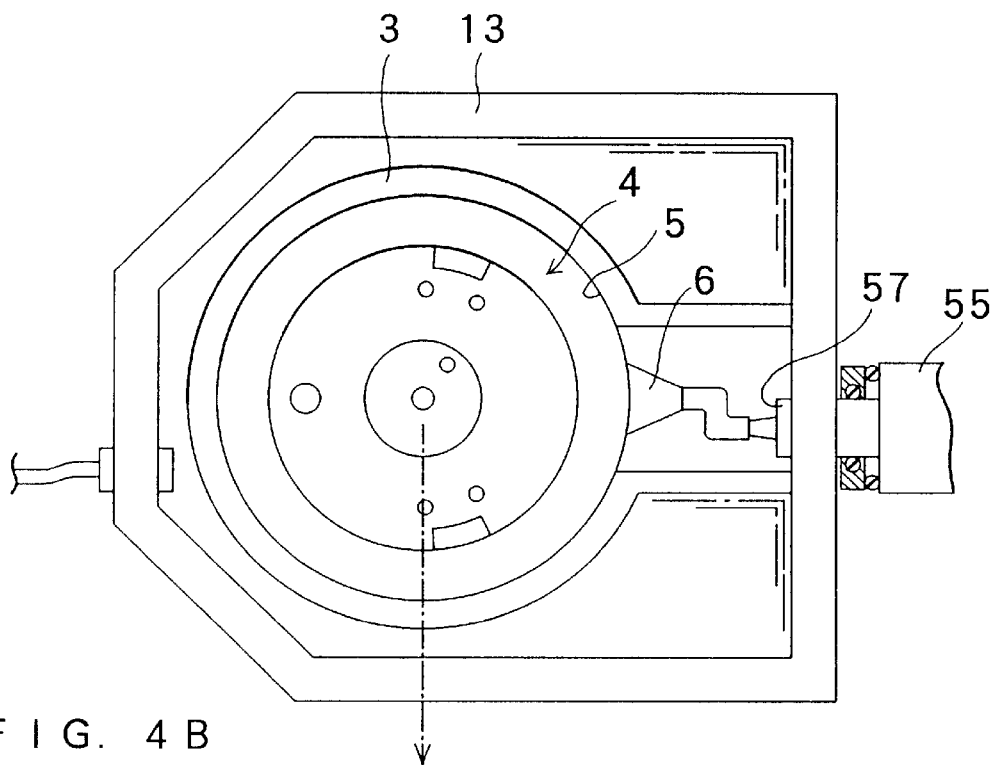
FIG. 4A is a top plan view of the lower mold portion.
Figure 4B:
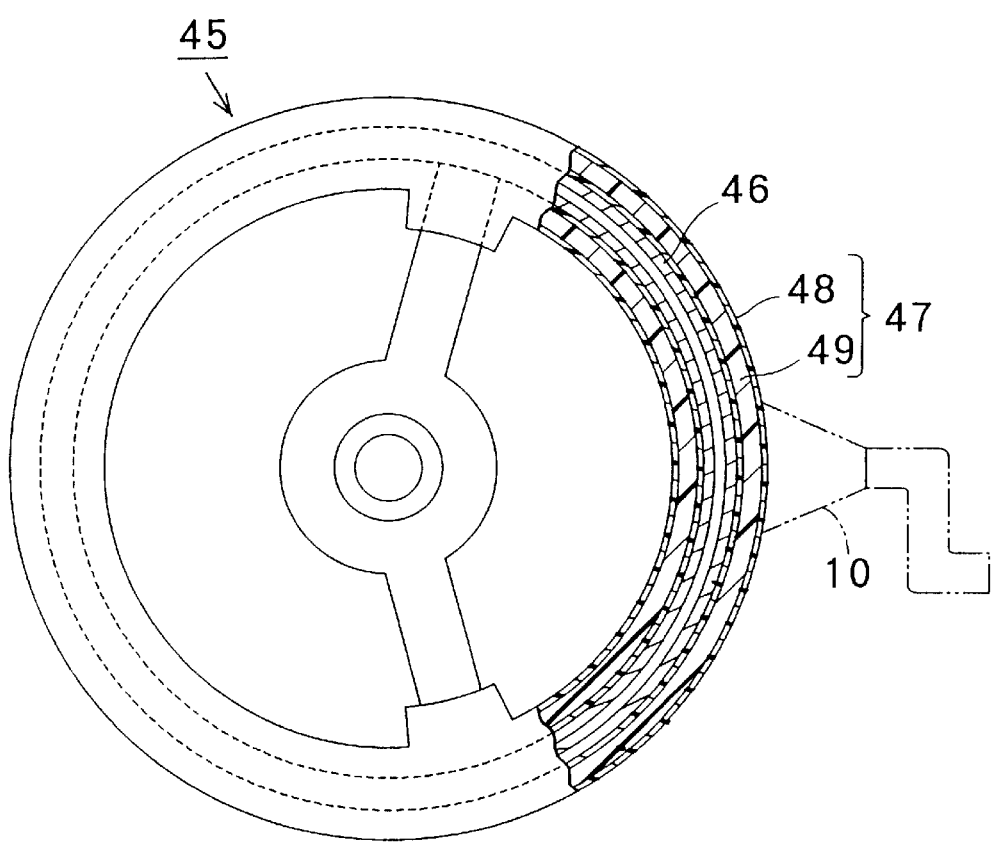
FIG. 4B is a top plan view, partly in section, of the molded product removed from the mold.

(6) Step of removing the molded product from the mold:

After the inner-forming polyurethane material U2 has been allowed to cure, the upper and lower mold portions 2 and 3 are separated from each other, while the upper and lower casing portions 12 and 13 are separated from each other, as shown in FIG. 3, and the steering wheel 45 having the polyurethane covering 47 is removed from the mold, as shown in FIG. 4B. The polyurethane covering 47 has a gate burr 10 formed by the inner-forming polyurethane material U2 in the gate 6, so the gate burr 10 is cut off.

Figure 6:
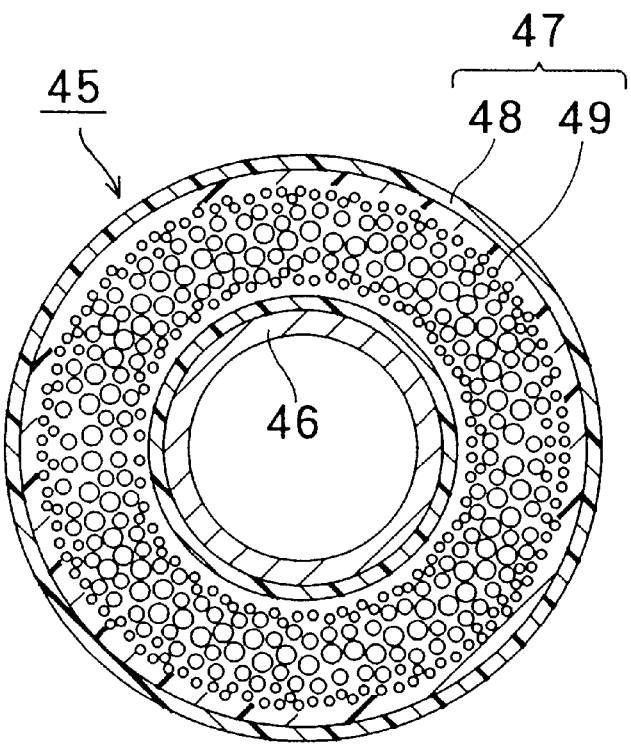
FIG. 6 is a cross-sectional view of a two-colored polyurethane covering molded by the same process.

According to the thus-molded two-colored polyurethane covering 47 by RIM, the surface portion 48 formed from the surface-forming RIM polyurethane material U1 containing a coloring agent covers up the whole surface of the inner portion 49 as a thin film and conceals them well, as is shown in FIGS. 4B and 6. Furthermore, since the surface portion 48 is prevented from being partially reduced in thickness, the inner portion 49 is not visible through the surface portion 48, and the color density of the surface portion 48 does not become uneven, thereby preventing the outward appearance of the covering 47 from being damaged. As a result, according to the present embodiment, the step of applying a coloring agent to the cavity wall 5 prior to injection molding is eliminated to thereby realize a shortened molding cycle and overcome any problem of deburring.

Furthermore, with the surface-forming RIM polyurethane material U1 having the composition of the present embodiment, the resulting surface portion 48 shows improvements in properties such as wear resistance, heat resistance and moisture resistance.

Other advantages of the present RIM process for manufacturing a two-colored molded polyurethane product are:

(1) It is possible to keep the amount of the coloring agent to a minimum and thereby cut down the overall cost of manufacture.

(2) The pigment particles which the coloring agent contains wear those parts of the material injection mechanism 21 through which they pass, and any worn part has to be changed to a new one. Since the amount of coloring agent being used can be kept to a minimum, however, it is possible to delay such wear and prolong a cycle for the maintenance of the material injection mechanism 21 and the change of any worn part thus reducing the relevant work and cost.

(3) It is also possible to decrease the use of additives, such as an aging inhibitor, with the inner-forming polyurethane material U2.

EXAMPLES

Examples 1 and 2 embodying this invention and Comparative Examples 1 to 7 were carried out to ascertain the effects of this invention by employing the molding apparatus and process as described above and the surface-forming polyurethane materials whose compositions are shown in Tables 1 and 2 below. In Comparative Examples 1 to 3 and 6, polyamines were used as polyols for accelerating the polyurethane reaction. In Comparative Examples 4, 5 and 7, polyether polyols were used, but the isocyanate or catalyst differed from what had been used in Examples 1 and 2. The same inner-forming polyurethane material was used in all of the Examples and Comparative Examples and no description thereof will be made, since it has nothing to do with the following evaluation.

TABLE 1

|  | Comparative Example 1 | Comparative Example 2 | Comparative Example 3 | Comparative Example 4 | Comparative Example 5 | Example 1 |
|---|---|---|---|---|---|---|
| Surface-forming material |  |  |  |  |  |  |
| polyol component |  |  |  |  |  |  |
| polyol | polyether polyamine | polyether polyamine | polyether polyamine | polyether polyol | polyether polyol | polyether polyol |
| chain extender | DETDA | 1,4 BD | triethanolamine | DEG | DEG | DEG |
| catalyst | — | organic tin | organic bismuth | organic bismuth | organic tin | organic bismuth |
| isocyanate component | IPDI | IPDI | IPDI | IPDI | HDI trimer | HDI trimer |
| Moldability |  |  |  |  |  |  |
| curing rate (curing time) | ○ (60 seconds) | × (20 minutes) | ○ (60 seconds) | ○ (60 seconds) | × (non-measurable) | ○ (60 seconds) |
| flowability | × | ○ | Δ | ○ | ○ | ○ |
| Properties |  |  |  |  |  |  |
| wear resistance | — | — | × | × | — | ○ |
| light resistance | — | — | × | ○ | — | ○ |

TABLE 2

|  | Comparative Example 6 | Comparative Example 7 | Example 2 |
|---|---|---|---|
| Surface-forming material polyol component |  |  |  |
| polyol | polyether polyamine | polyether polyol | polyether polyol |
| chain extender | triethanolamine | DEG | DEG |
| catalyst | DBU/ potassium octylate | DBU/ potassium octylate | DBU/ potassium octylate |
| isocyanate component | IPDI | IPDI | HDI trimer |
| Moldability |  |  |  |
| curing rate (curing time) | ○ (60 seconds) | ○ (60 seconds) | ○ (60 seconds) |
| flowability | Δ | ○ | ○ |
| Properties |  |  |  |
| wear resistance | × | × | ○ |
| light resistance | × | ○ | ○ |

Referring to Tables 1 and 2, the polyether polyamines had a molecular weight of 3000, and the polyether polyols had a molecular weight of 3800. DETDA stands for diethyltoluenediamine, 1,4 BD stands for 1,4-butanediol, and DEG stands for diethylene glycol. Dibutyltin dilaurate was used as the organic tin catalyst, and bismuth neodecanoate as the organic bismuth catalyst (though bismuth indecanoate or octylate could also be used). The mixed catalyst was a mixture of 1.5 parts by weight of DBU (for 100 parts by weight of polyol) and 2 parts by weight of potassium octylate (ditto). IPDI stands for modified isophorone diisocyanate (containing 18% of NCO) and HDI trimer stands for a hexamethylene diisocyanate trimer (containing 21% of NCO). The surface-forming polyurethane materials used in Examples 1 and 2 and Comparative Examples 1 to 7 contained the same coloring agent, though not shown in Table 1 or 2.

The following is a description of the methods and standards employed for evaluation as to moldability and other properties:

[Curing Rate]

The upper and lower portions 2 and 3 of the mold 1 were separated from each other 60 seconds after the injection of the surface-forming and inner-forming polyurethane materials into the cavity 4, and the surface portion 48 formed from the surface-forming polyurethane material was touched by a finger. It was evaluated as "○" when it was not sticky, and as "×" when it was. Accordingly, the curing time of 60 seconds means that substantially complete curing occurred within 60 seconds. In each case where evaluation was "×", the curing time at which the surface portion ceased to be sticky was measured up to a maximum of 30 minutes.

[Flowability]

The surface-forming polyurethane material which had been injected into the cavity 4 was evaluated as "○" when it covered the whole surface of the cavity wall 5, as "Δ" when it covered ⅔ or more thereof, and as "×" when it covered less than ⅔ thereof.

[Wear Resistance]

Figure 7:
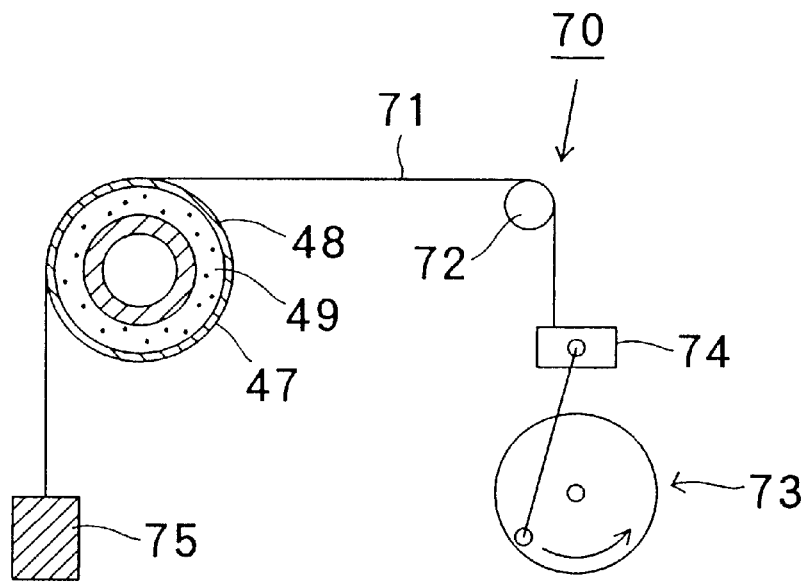
FIG. 7 is a schematic diagram showing an apparatus and a method used for wear resistance testing.
Figure 8:
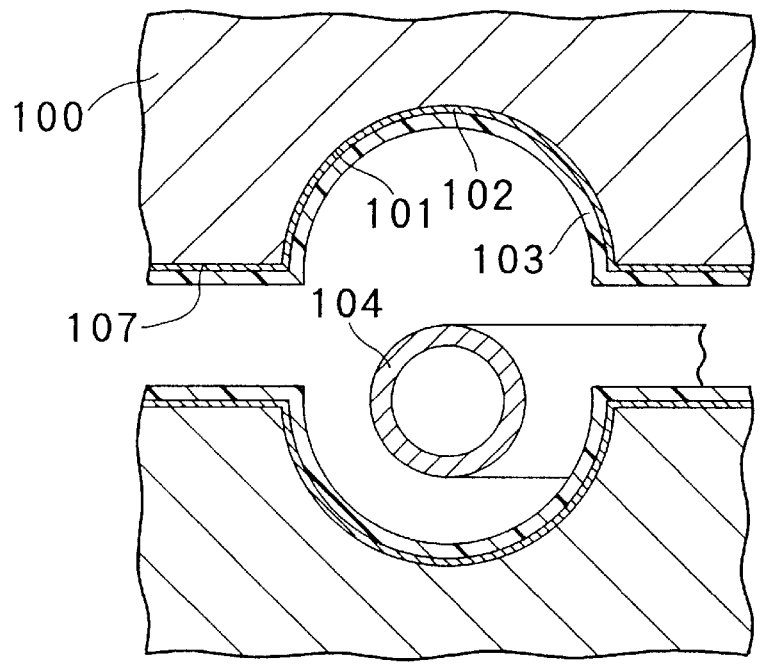
FIG. 8 is a sectional view showing the step of applying a mold release agent and an in-mold coating material to a cavity wall in a known RIM process for molding a polyurethane covering.
Figure 9:
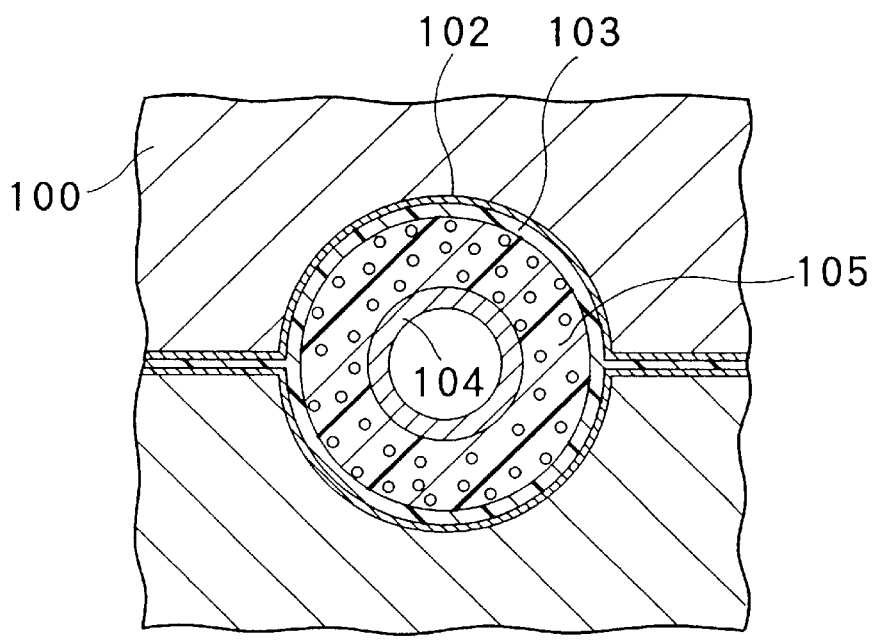
FIG. 9 is a sectional view showing the step of forming an inner portion in the same known process.
Figure 10:
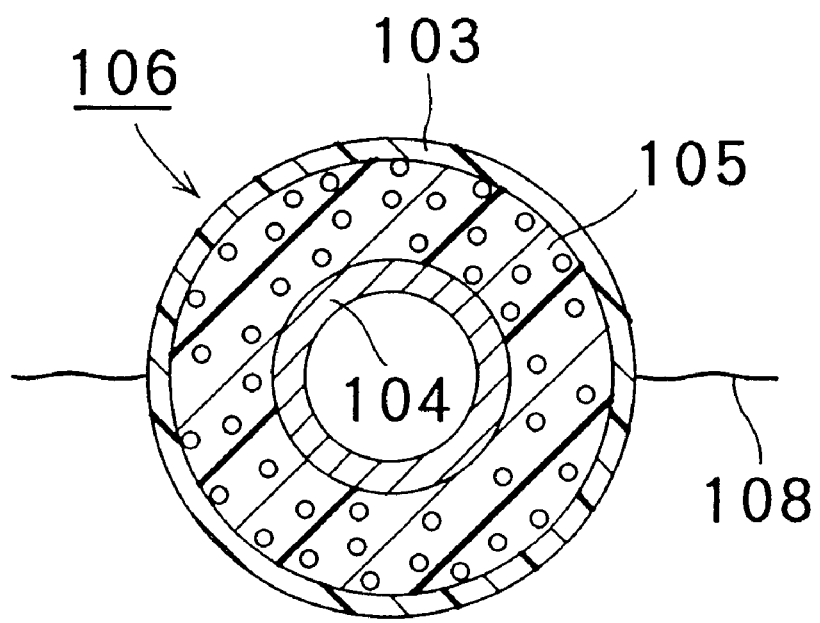
FIG. 10 is a cross-sectional view of the polyurethane product molded by the same known process.

A specimen of each two-colored polyurethane covering 47 having a surface portion 48 and an inner portion 49 was subjected to 50,000 times of wear tests in a wear resistance tester 70 as shown in FIG. 7, and examined for any change in its surface portion 48. It was evaluated as "○" when substantially no wear could be recognized, and as "×" when clear marks of wear could be recognized. The wear resistance tester 70 has a cotton canvas 71 (#10 standard) conforming to the requirements of JIS-L3102, extending about the polyurethane covering 47 and a roller 72 and having one end connected to a vertically movable member 74 driven by a crank mechanism 73, while carrying a weight 75 having a mass of 100 g at the other end thereof. The cotton canvas 71 is reciprocatable for rubbing against the surface portion 48.

[Light Resistance]

After having been left to stand for 400 hours on a fadeometer (having a black-panel temperature of 83° C.), the two-colored polyurethane covering was examined for any change in color of its surface portion, and evaluated as "○"

when it did not show any appreciate change in color, and as "x" when it showed a clear change in color.

As is obvious from the results of evaluation shown in Tables 1 and 2, Comparative Example 1 showed a high curing rate, but so low a level of flowability that the material stayed only in the vicinity of the gate, and failed to allow evaluation as to any other properties. Comparative Example 2 showed a good level of flowability, but was not worthy of any further evaluation because of too slow curing. Comparative Examples 3 and 6 showed quick curing, but unsatisfactory flowability, and low properties. Comparative Examples 4 and 7 showed quick curing and good flowability, but low wear resistance. Comparative Example 5 showed good flowability, but were not worthy of any further evaluation because of too slow curing. On the other hand, Examples 1 and 2 showed quick curing, good flowability and high properties.

As many apparently widely different embodiments of this invention may be made without departing from the spirit and scope thereof, it is to be understood that the invention is not limited to the specific embodiments thereof except as defined in the appended claims.

What is claimed is:

1. A two-colored molded product of polyurethanes made by reactive injection molding and comprising:

a surface portion formed by injecting an amount of a non-yellowing surface-forming polyurethane material containing a polyether polyol, a hexamethylene diisocyanate trimer, a coloring agent and an organic bismuth catalyst into a closed mold cavity having a pressure below atmospheric pressure, the amount of surface-forming polyurethane injected being relatively small compared to the gross volume of said mold cavity; and an inner portion formed by injecting an inner-portion-forming polyurethane material into said closed mold cavity.

2. A two-colored molded product of polyurethanes as set forth in claim 1, wherein said organic bismuth catalyst is at least one selected from the group consisting of bismuth neodecanoate, bismuth isodecanoate and bismuth octylate.

3. A two-colored molded product of polyurethanes as set forth in claim 1, wherein a mold release agent is added to said surface-forming polyurethane material.

4. A two-colored molded product of polyurethanes made by reactive injection molding and comprising:

a surface portion formed by injecting an amount of a non-yellowing surface-forming polyurethane material containing a polyether polyol, a hexamethylene diisocyanate trimer, a coloring agent and a mixed catalyst into a closed mold cavity having a pressure below atmospheric pressure, the amount of surface-forming polyurethane injected being relatively small compared to the gross volume of said mold cavity, said mixed catalyst being a mixture of a first catalyst having the chemical formula

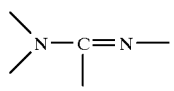

and a second catalyst represented by the chemical formula

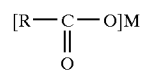

where M stands for an alkali metal or an alkaline earth metal, and R stands for:

hydrogen, an alkyl group having 1 to 20 carbon atoms, an alkenyl or alkynyl group having 2 to 20 carbon atoms, these groups being straight or branched and optionally may be substituted by one carboxyl group or one or more halogens, a cycloalkyl group having 3 to 6 carbon atoms, this group being unsubstituted or substituted by one carboxyl group, one or more alkyl groups having 1 to 6 carbon atoms or alkenyl or alkynyl groups having 2 to 6 carbon atoms, these groups being straight or branched, or an aryl group, this group being unsubstituted or substituted by one or more halogens, one or more alkyl groups having 1 to 8 carbon atoms or alkenyl or alkynyl groups having 2 to 8 carbon atoms, any of these groups being straight or branched, or by one aryl group or one carboxyl group; and an inner portion formed by injecting an inner-portion-forming polyurethane material into said closed mold cavity.

5. A two-colored molded product of polyurethanes as set forth in claim 4, wherein said first catalyst is at least one selected from the group consisting of DBU (1,8-diaza-bicyclo-(5, 4, 0)undecene-7), DBN (1,5-diaza-bicyclo-(4, 3, 0)nonene-5) and phenolic salt of DBU.

6. A two-colored molded product of polyurethane as set forth in claim 4, wherein said second catalyst is at least one selected from the group consisting of potassium octylate, sodium octylate and sodium formate.

7. A two-colored molded product of polyurethanes as set forth in claim 4, wherein said first and second catalysts have a mixing ratio of 1:1 to 1:5.

8. A two-colored molded product of polyurethanes as set forth in claim 4, wherein said first catalyst is at least one selected from the group consisting of DBU (1, 8-diaza-bicyclo-(5, 4, 0) undecene-7), DBN (1,5, -diaza-bicyclo-(4, 3, 0) nonene-5) and a phenolic salt of DBU, said second catalyst is at least one selected from the group consisting of potassium octylate, sodium octylate and sodium formate, and said first and second catalysts have a mixing ratio of 1:1 to 1:5.

9. A two-colored molded product of polyurethanes as set forth in claim 4, wherein a mold release agent is added to said surface-forming polyurethane material.

10. The two-colored molded product of polyurethanes of claim 1, wherein the amount of surface-forming polyurethane injected is sufficient to form a surface around said inner portion.

* * * * *